United States Patent

Yoneda et al.

[11] Patent Number: 5,871,843
[45] Date of Patent: Feb. 16, 1999

[54] LAMINATE AND PROCESS FOR ITS PRODUCTION

[75] Inventors: Takashige Yoneda; Makoto Fukawa; Takeshi Morimoto; Kazuo Sato; Fumiaki Gunji; Hiromichi Nishimura; Satoshi Takeda; Yasuo Hayashi, all of Yokohama; Hiroyuki Fujita, Kanagawa, all of Japan

[73] Assignee: Asahi Glass Company Ltd., Tokyo, Japan

[21] Appl. No.: 824,290

[22] Filed: Mar. 26, 1997

[30] Foreign Application Priority Data

Mar. 27, 1996 [JP] Japan .................................. 8-072760

[51] Int. Cl.$^6$ .............................. G02B 1/10; C03C 17/02
[52] U.S. Cl. ...................... 428/337; 428/315.5; 428/428; 427/165
[58] Field of Search ............................. 428/315.5, 319.1, 428/327, 428, 429, 447, 448, 337; 427/162, 164, 165

[56] References Cited

U.S. PATENT DOCUMENTS 4,374,158 2/1983 Taniguchi et al. .
4,446,171 5/1984 Thomas ................................... 427/160
4,753,516 6/1988 Doi et al. ................................ 350/321
5,482,768 1/1996 Kawasato et al. .
5,637,517 6/1997 Floch et al. ............................ 427/128

FOREIGN PATENT DOCUMENTS 0 504 926 9/1992 European Pat. Off. .
0 597 490 5/1994 European Pat. Off. .

OTHER PUBLICATIONS

Patent Abstracts of Japan, vol. 095, No. 008, Sep. 29, 1995, JP 07 138046, May 30, 1995.

Primary Examiner—Daniel Zirker
Attorney, Agent, or Firm—Oblon, Spivak, McClelland, Maier & Neustadt, P.C.

[57] ABSTRACT

A laminate comprising a substrate and at least one layer formed on the substrate, in which the outermost layer as a surface layer has a plurality of micropores therein and, at its surface, a flat portion and fine craters, said flat portion having a surface roughness $R_a$ of at most 3 nm and an area ratio of at least 20%.

4 Claims, 3 Drawing Sheets

LAMINATE AND PROCESS FOR ITS PRODUCTION

The present invention relates to a laminate and a process for its production.

To secure safety of automobiles or railroad vehicles, a high level of light transmittance is required for the front window portion. Especially in order to reduce the reflection or glare during driving at night, a substrate having a low reflection performance is essential. Further, a substrate for construction or building, such as double glazing, glass for picture frames, show window glass or cover glass for a solar energy calorifier, or a display part for an office appliance such as a display panel or a display device, is desired to have high light transmittance and low reflecting properties. Further, a substrate having low reflecting properties is even more important to improve the properties of optical part materials such as solar cells, eye glasses or cameras.

A low reflecting substrate is therefore required in wide range of fields. In the case of a substrate which is used in a relatively severe environment as in the above-mentioned fields, not only low reflecting properties but also the durability for maintaining such properties and stain-proofing properties are simultaneously required.

As a method for obtaining a low reflecting substrate, it has heretofore been known to apply antireflection treatment by means of light interference by coating on the substrate surface, A) one layer of a low refractive index film, or B) an optical multilayer film prepared by alternately laminating a low refractive index film and a high refractive index film.

To reduce the reflectance within a wide wavelength range, it is advisable to take the method B). However, this method has had a problem of costs, since at least two layers, preferably at least three layers, are required.

According to the method A) it is advisable to select a material having a low refractive index and high durability (abrasion resistance, chemical resistance, moisture resistance, etc.) for the outermost layer, but heretofore, there has been no material which simultaneously satisfies these properties.

As a method for obtaining low reflecting properties, a method has been proposed to make $MgF_2$ as a low refractive index material (refractive index: 1.22) porous (JP-A-7-150356). However, if it is made porous, the tissue of $MgF_2$ itself tends to be brittle, and the surface structure tends to be coarse due to open pores, whereby the friction coefficient tends to be large, and durability to mechanical abrasion or scratching tends to be remarkably impaired. Further, it has had a drawback that if a stain is deposited on the surface, it has been difficult to remove it, since the surface has many open pores.

Also with respect to the material itself, a film-forming method by sputtering of $AlF_3$ (refractive index: 1.36) has been studied (JP-A-7-151906). However, the fluoride obtained by such a method is inferior to an oxide in the moisture resistance or oxidation resistance, although it has a lower refractive index as compared with an oxide low refractive index material such as $SiO_2$. Therefore, it is not practically used so much in the above-mentioned field where the durability is required.

Further, as another low refractive index material, an anti-reflective material has been studied which has a cured coating film formed by curing an acrylic copolymer together with a crosslinking agent, as a layer beneath a polymer (JP-A-2-019801) having a fluorine-containing alicyclic structure (JP-A-5-254073). When the substrate is a plastic, this material provides sufficient abrasion resistance, adhesion to the substrate, etc. However, when the substrate is glass, it has had a problem that no adequate mechanical strength can be obtained. Further, this material has another drawback that as compared with inorganic materials, it is rather expensive.

As another low refractive index material, $SiO_2$ (refractive index: 1.44 to 1.47) is well known. This material has had a drawback that the refractive index is high although it is excellent in the durability as compared with the above-mentioned fluoride type low refractive index material. For example, when one layer of $SiO_2$ is coated in a thickness of 100 nm on the surface of soda lime glass (refractive index: 1.52), the reflectance at 550 nm is about 3% which is not low enough in a field where high light transmittance is required.

To compensate such a drawback, it is well known to provide an irregular porous structure on the surface of the $SiO_2$ film to obtain a low refractive index film. Various methods have been studied to obtain a $SiO_2$ layer having such an irregular surface structure.

For example, a method is well known in which borosilicate glass is used as the substrate, this glass is dipped in a solution mixture of a hydrofluoric acid solution and a nitric acid solution to make the shape of the glass surface porous so that the refractive index gradually changes from the surface layer to the bulk layer to obtain a low reflection structure (J. Opt. Soc. Am., 66,515 (1976)).

However, this method is limited to an application where the substrate is a phase separable glass such as borosilicate glass and has had problems such that due to the irregular structure having numerous holes open on the surface of the substrate, the mechanical durability against abrasion, scratching, etc., is poor, and soil or stain is likely to deposit in the open holes, and the deposited soil is hardly removable.

On the other hand, as a method which is not restricted by the type of the substrate, a method has been studied which comprises dipping a substrate in a treating liquid having boric acid added to a saturated silicon oxide aqueous solution of hydrosilicofluoric acid (JP-A-60-176947). This is a method which utilizes a mechanism such that by the addition of boric acid to an aqueous hydrosilicofluoric acid solution, silicon oxide will precipitate from the liquid in which silicon oxide is in a supersaturated state, and is a method in which the substrate is dipped in a state where precipitated silicon oxide is floating, to form a $SiO_2$ film having numerous protuberances (convexes) having a diameter of from 30 to 500 nm and a height of from 20 to 300 nm on its surface.

This method is not a high temperature process and has a merit that it can be applied not only to a glass substrate but also to any material such as a plastic plate, a ceramic plate or the like. However, also the surface of the $SiO_2$ film obtained by this method has an irregular structure having numerous open holes as described above, and especially, the $SiO_2$ film surface obtained by this method has numerous protuberances, whereby the scratch resistance is poor, and soil or stain is hardly removable.

JP-A-61-93402 (which corresponds U.S. Pat. No. 4,374,158) proposes a method for forming a low reflection film comprising micropores (microvoids) and fine inorganic particles by coating fine inorganic particles and a vehicle component on a substrate, followed by treatment with an activated gas. The low reflection film has low abrasion resistance, and it is proposed to provide a protective coating layer such as a thermosetting resin film, a silicon type polymer coating film or an acrylic polymer coating film on the low reflection film. However, no adequate abrasion resistance has been attained, and there has been a problem that the low reflecting properties are sacrificed by the provision of the protective coating layer.

As described in the foregoing, as a low refractive index material excellent in durability, the $SiO_2$ film may be mentioned, but its refractive index is not sufficient to obtain the desired level of low reflecting properties. On the other hand, a method of providing an irregular structure to the surface which is effective for reducing the refractive index, has had problems from the viewpoint of the mechanical strength and stain-proofing properties.

It is an object of the present invention to provide a laminate which has excellent low reflecting properties and is excellent in abrasion resistance, chemical resistance, weather resistance and stain-proofing properties and which is capable of maintaining such effects semipermanently, and a process for its production.

The present invention provides a laminate comprising a substrate and at least one layer formed on the substrate, in which the outermost layer as a surface layer has a plurality of micropores therein and, at its surface, a flat portion and fine craters, said flat portion having a surface roughness $R_a$ of at most 3 nm and an area ratio of at least 20%.

Now, the present invention will be described in detail with reference to the preferred embodiments.

The surface roughness $R_a$ used for this invention is a numerical value as defined in JIS B0601.

For the measurement of the surface roughness $R_a$, an atomic force microscope (AFM) (SPI3800.SPA300, manufactured by Seiko Denshi K. K.) was employed. The measurement was carried out under such conditions that $Si_3N_4$ was used as a probe, the spring constant was 20 N/m, the scanner was 20 μm, and the measuring mode was a DFM mode. The surface roughness $R_a$ was measured between two points and calculated by a software mounted on the apparatus.

Figure 4:
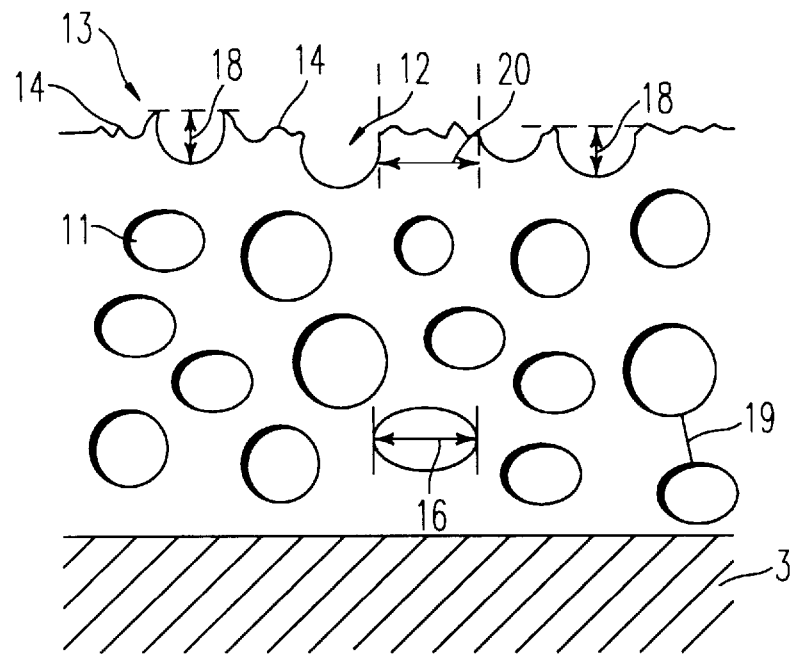
FIG. 4 is a diagrammatical cross-sectional view of the laminate of the present invention.
Figure 5:
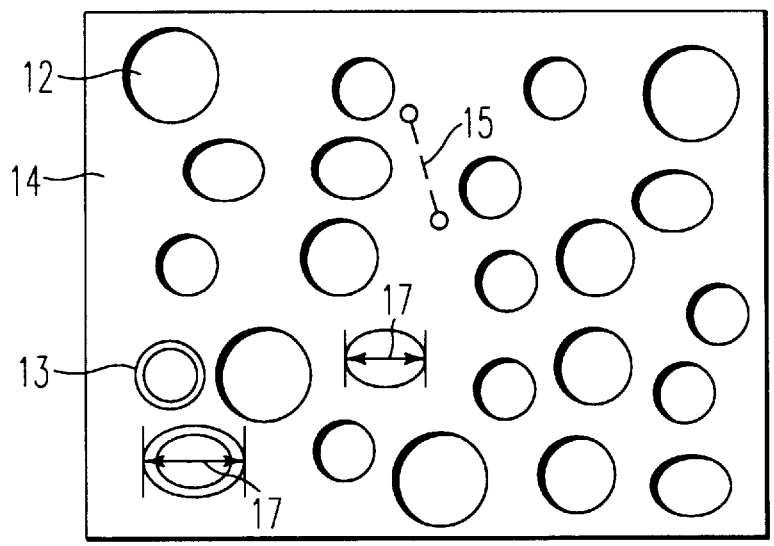
FIG. 5 is a diagrammatical view illustrating the surface of the outermost layer as a surface layer in the present invention.

FIG. 4 is a diagrammatical cross-sectional view of the laminate of the present invention, and FIG. 5 is a diagrammatical view illustrating the surface of the coating film of the outermost layer as a surface layer (hereinafter referred to simply as the coating film).

Reference numeral 11 is a micropore (microvoid) which is formed by thermal decomposition/evaporation of the thermally decomposable resin, evaporation of the solvent or the like and which is an air portion present in the coating film.

Reference numeral 12 is a crater which is formed by evaporation (thermal decomposition) of the thermally decomposable resin at the coating film surface.

Reference numeral 13 is a part of the crater, and when the edge of the crater forms a ring-shaped protuberance, such a portion is included in the crater.

Reference numeral 14 is a flat portion, which corresponds to the portion of the coating film surface excluding the fine craters. In reality, the flat portion has waviness as shown in the drawings, depending upon e.g. the coating conditions. Therefore, it is not an ideal flat and smooth surface, but for the purpose of the present invention, this portion is defined as a flat portion.

Reference numeral 15 indicates a distance between optional two points on the flat portion. The surface roughness ($R_a$) of the flat portion is a value obtained by calculating one-dimensional surface roughness between the optional two points on the flat portion in accordance with the definition of JIS B0601.

Reference numeral 16 is the size of a micropore, which corresponds to the longest diameter of the micropore.

Reference numeral 17 is the size of a fine crater, which corresponds to the longest diameter of the crater.

Reference numeral 18 is the depth of a fine crater, which corresponds to the difference in height between the edge and the bottom of the crater.

Reference numeral 19 is the distance between micropores, which corresponds to the distance from an optional micropore to a micropore present closest thereto.

Reference numeral 20 is the distance between fine craters, which corresponds to the distance from an optional fine crater to a fine crater present closest thereto.

The area of fine craters was calculated from the size and the number of fine craters present in a unit surface area, and the area of the flat portion was obtained as the rest of the area excluding the area of fine concaves.

The average size of micropores was determined by measuring the size and the number of micropores present in a unit cross-sectional area and taking the average value.

The average size of fine craters was determined by measuring the size and the number of fine craters present in a unit surface area and taking the average value.

In a case where a separate layer is present beneath the outermost layer, they are distinguished from each other by discontinuity of the refractive index.

The excellent properties such as low reflecting properties, abrasion resistance and stain-proofing properties, are attributable to the structural characteristics of the coating film of the outermost layer as a surface layer. Now, the structural characteristics will be described in detail.

The first structural characteristic of the coating film is that it contains micropores therein, and by the presence of micropores in the film, the refractive index of the film can remarkably be reduced, whereby it has been made possible to realize excellent low reflecting properties which have not been attained heretofore.

The second structural characteristic of the present invention is that these micropores are present in a plurality. By this structural characteristic, it has been made possible to realize both low reflecting properties and mechanical strength of the coating film simultaneously.

The third structural characteristic of the coating film of the present invention is that the film has a flat portion having an extremely small roughness i.e. $R_a$ being at most 3 nm, at an area ratio larger than a certain level on its surface, in spite of the fact that the porosity is high as compared with conventional porous coating films.

These structural characteristics are attributable to the improvement in the mechanical strength such as abrasion resistance or scratch resistance, the stain-proofing properties whereby stain hardly adheres to the surface, and the cleaning efficiency such that when stain such as a finger print is attached on the surface, it can easily be wiped off. Conventional coating films of a porous type having low reflecting properties have had numerous protuberances with little flat portion, whereby mechanical strength such as abrasion resistance or scratch resistance is poor, stain is likely to deposit on the surface, and the deposited stain is hardly removable.

Namely, the coating film of the present invention has excellent low reflecting properties, abrasion resistance and stain-proofing properties attributable to the structural characteristics that it has a plurality of micropores in the film and, on its surface, an extremely smooth flat portion having a surface roughness $R_a$ of at most 3 nm at an area ratio of at least 20%, preferably at least 35%. From the viewpoint of the abrasion resistance and the stain-proofing properties, $R_a$ is more preferably at most 1 nm.

The size, distribution and shape of the plurality of micropores present in the film are not particularly limited and can optionally be selected depending upon the particular purpose or application. However, the average size of micropores present in the film is preferably from 10 to 150 nm from the viewpoint of low reflecting properties and mechanical strength. If the average size of the micropores is less than 10 nm, the effect for reducing the refractive index of the film tends to be not substantial, and it tends to be difficult to obtain low reflecting properties. On the other hand, if the average size of the micropores exceeds 150 nm, it tends to be difficult to secure the mechanical strength of the film. If the average size of the micropores exceeds 150 nm, reduction of the transparency of the film will be problematic depending upon the particular application.

The shape of the micropores present in a plurality in the film is not particularly limited. However, from the viewpoint of abrasion resistance and low reflecting properties, a spherical or oval shape is preferred. The volume ratio of micropores in the film (the degree of distribution of micropores) is preferably from 3 to 35% from the viewpoint of low reflecting properties and mechanical strength. If the volume ratio of micropores in the film is less than 3%, the effect for reducing the refractive index of the film will not be substantial, whereby it tends to be difficult to attain low reflecting properties. On the other hand, if it exceeds 35%, the mechanical strength of the film tends to be impaired.

The average distance between adjacent micropores is determined by the size and distribution of the micropores, but it is preferably at least 0.5 nm. If the average distance between adjacent micropores is too short, the feature that micropores are independent, will hardly be obtained. Accordingly, it will be difficult to secure adequate mechanical strength.

Further, in order to increase the low reflecting properties, a plurality of fine craters are formed on the surface of the coating film. Formation of fine craters contributes to reduction of the refractive index of the film like the plurality of micropores in the film. The shape, size and distribution of the fine craters formed on the surface are not particularly limited, but the average size of the craters is preferably from 10 to 150 nm from the viewpoint of low reflecting properties, mechanical strength and stain-proofing properties. If the average size of the fine craters is less than 10 nm, the effect for reducing the refractive index is small. On the other hand, if it exceeds 150 nm, the stain-proofing properties of the film tend to be poor, and the mechanical strength of the film tends to be impaired. Further, if it exceeds 150 nm, the transparency will be low, which will be problematic depending upon the particular application.

The shape of fine craters is not particularly limited, but a spherical shape, a shape corresponding to a part thereof, an oval shape or a shape corresponding to a part thereof, is preferred.

The distribution of fine craters may be determined depending upon the desired low reflecting properties. Namely, when a higher level of low reflecting properties is required, the distribution is selected so that the ratio of presence of fine craters on the surface will increase, or so that deeper fine craters will be formed. From the viewpoint of mechanical strength and stain-proofing properties, the distribution is preferably such that the area ratio of fine craters on the film surface is at most 80%, preferably at most 65%. Further, the depth of fine craters is preferably at most 150 nm.

The coating film of the present invention is a low refractive index layer which has not been available heretofore, and it is formed as the outermost layer i.e. as a surface layer. However, a separate coating film may be formed on a part or whole of the coating film for some purpose within a range not to impair the low reflecting properties.

For example, a coating film such as 1) a photocatalytic material layer to improve the stain-proofing effect, 2) an electroconductive material layer for e.g. antistatic effect, 3) a water and oil repellent material layer to improve the water and oil repellency, 4) a hydrophilic, water-absorptive or photocatalytic material layer to impart an anti-fogging or hydrophilic property, 5) a coloring layer for improvement of the appearance, or 6) a heat ray-absorbing/reflecting layer or an ultraviolet ray absorbing/reflecting layer to provide selectivity for the wavelength, may be formed.

When such a separate coating film is to be provided, the film thickness is preferably at a level not to impair the low reflecting properties, specifically at most 50 nm, more preferably at most 30 nm.

Further, the material for the coating film of the present invention is not limited and may be selected and determined depending upon the particular purpose or application. For example, when it is desired to add electrical conductivity in addition to the low reflecting properties, the entirety or part of the coating film-forming material may be substituted by an electroconductive material (such as tin oxide, zinc oxide or ITO).

When selection of light absorption is required (such as coloring, heat ray absorption or ultraviolet ray absorption), the coating film may be formed with a material whereby selection of light absorption is possible, such as Co, Fe, Cr, Mn, Cu, Zn, Ce, Ti, Zr, Au, Ag or their oxides.

When catalytic effects are expected, the coating film may be formed by a material such as Sn, $TiO_2$, Ag or Pt.

As the coating film-forming material, an organic material, an inorganic material, a metal material or a composite material thereof may be selected for use. As preferred materials, various metal oxide materials, particularly materials composed mainly of oxides of one or more metals selected from the group consisting of Si, Al, Ti, Zr and Sn, may be mentioned.

In general, an electroconductivity-imparting material (such as an oxide of Sn), a photocatalytic activity-imparting material (such as an oxide of Ti) or a material for improving abrasion resistance or chemical resistance (such as an oxide of Zr or Al) provides a high refractive index for the film. Therefore, the oxide material of this type has a high surface reflection and brings about a problem of glare or reflection on its surface, whereby its application field is limited.

However, when the technique of the present invention is applied to a metal oxide material of this type, it is possible to reduce the reflection, and it is possible to realize its application to a wide range of fields, and its effects are remarkable. Namely, according to the present invention, it is possible to impart excellent low reflecting properties to articles having electrical conductivity, photocatalytic properties, abrasion resistance or chemical resistance.

From the viewpoint of low reflecting properties and abrasion resistance, a coating film containing a silicon oxide material is preferred. The coating film may be a coating film made of a single material or a plurality of such materials.

The coating film of the present invention has its features in its structure, and the method for its production is not particularly limited. However, some examples of the method whereby the laminate of the present invention can economically efficiently be prepared, will be described in detail.

As a treating agent whereby the coating film of the present invention can be efficiently obtained, a treating agent may, for example, be employed which comprises (1) fine polymer particles having an average particle size of from 0.01 to 0.20 μm (hereinafter referred to as compound (1)), (2) a reactive metal compound (hereinafter referred to as compound (2)) having a metal atom to which isocyanate groups and/or hydrolyzable groups are bonded, and (3) a diluting solvent (hereinafter referred to as compound (3)).

As a process for producing a laminate comprising a substrate and at least one layer formed on the substrate, preferred is a process which comprises coating the above-mentioned treating agent, followed by heat treatment to form the outermost layer as a surface layer which has a plurality of micropores in the layer and, at its surface, a flat portion having a surface roughness $R_a$ of at most 3 nm at an area ratio of at least 20%.

Compound (1) is a component essential to form the plurality of micropores in the film and the fine craters on the film surface, and the sizes and shapes of the micropores and fine craters can be controlled by the average particle size and the shape. In order to form micropores and craters having the above-mentioned preferred sizes and shapes, the average size of compound (1) is preferably from 0.01 to 0.20 μm, more preferably from 0.05 to 0.15 μm. There is no particular limitation as to the shape of compound (1). However, a spherical shape, an oval shape or a needle shape is, for example, preferred. In the present invention, the average size of compound (1) means an average of the longest portions of the respective particles.

The material of compound (1) is not particularly limited, and commercially available polymers made of various materials can be used. Fine polymer particles may be made, for example, of a polyethylene resin, a polypropylene resin, a polystyrene resin, a polyacrylate resin, a polymethylmethacrylate resin, a polyvinyl chloride resin, a polyvinyl alcohol resin, a polycarbonate resin, a polyacetal resin, a polyester resin, a polyamide resin, a polyimide resin, a fluorine resin, a phenol resin, an epoxy resin or a silicone resin. The material for the fine polymer particles is at least one member selected from these resins.

Among the above materials for the fine polymer particles, particularly preferred is a thermoplastic resin such as a polystyrene resin or a polymethyl methacrylate resin.

The molecular weight of the fine polymer particles is not particularly limited so long as the above particle size is satisfied. The molecular weight is preferably from 10,000 to 1,000,000. If the molecular weight is too small, it is likely to interact with a solvent and tends to be susceptible to an influence such as dissolution or swelling, whereby it tends to be difficult to maintain the shape of the fine polymer particles. If the molecular weight is too large, it tends to be difficult to obtain fine particles Compound (2) is a reactive metal compound, which is a material for forming other than the micropore portions of the coating film. Compound (2) is a component which is essential to attain the excellent mechanical properties of the film and to assist good dispersion of compound (1). Here, the reactive metal compound is a general name for a compound having a metal atom to which an isocyanate group and/or a hydrolyzable group is directly bonded.

Here, the hydrolyzable group may, for example, a halogen atom, an alkoxy group, an acyloxy group, an alkoxy-substituted alkoxy group, an aminoxy group, an amide group, a ketoximate group, a hydroxyl group, an epoxy group, or a glycidyl group.

The metal atom in the reactive metal compound is not particularly limited. However, as mentioned above, it is preferably at least one metal selected from the group consisting of Si, Al, Ti, Zr and Sn. In a case where the metal atom is Si, the compound may be called a reactive silicon compound. Specific examples of such a reactive silicon compound include the following:

Tetraalkoxysilanes such as methyl silicate, ethyl silicate, n-propyl silicate, i-propyl silicate, n-butyl silicate, sec-butyl silicate and t-butyl silicate, or tetraisocyanate silane.

Trialkoxy or triacyloxysilanes such as methyl trimethoxysilane, methyl triethoxysilane, methyl triacetoxysilane, methyl tributoxysilane, ethyl trimethoxysilane, ethyl triethoxysilane, vinyl trimethoxysilane, vinyl triethoxysilane, vinyl triacetoxysilane, phenyl trimethoxysilane, phenyl triethoxysilane, phenyl triacetoxysilane, γ-chloropropyl trimethoxysilane, γ-chloropropyl triethoxysilane, γ-chloropropyl triacetoxysilane, 3,3,3-trifluoropropyl trimethoxysilane, γ-glycidoxypropyl trimethoxysilane, γ-glycidoxypropyl triethoxysilane, γ-(βglycidoxyethoxy) propyl trimethoxysilane, β-(3,4-epoxycyclohexyl)ethyl trimethoxysilane, β-(3,4-epoxycyclohexyl)ethyl triethoxysilane, γ-methacryloxypropyl trimethoxysilane, γ-aminopropyl trimethoxysilane, γ-aminopropyl triethoxysilane, γ-mercaptopropyl trimethoxysilane, γ-mercaptopropyl triethoxysilane, N-β(aminoethyl)-γ-aminopropyl trimethoxysilane, and β-cyanoethyl triethoxysilane.

Dialkoxysilanes or diacyloxysilanes, such as dimethyl dimethoxysilane, phenyl methyl dimethoxysilane, dimethyl diethoxysilane, phenyl methyl diethoxysilane, γ-glycidoxypropyl methyl dimethoxysilane, γ-glycidoxypropyl methyl diethoxysilane, γ-glycidoxypropyl phenyl dimethoxysilane, γ-glycidoxypropyl phenyl diethoxysilane, γ-chloropropyl methyl dimethoxysilane, γ-chloropropyl methyl diethoxysilane, dimethyldiacetoxysilane, γ-methacryloxypropyl methyl dimethoxysilane, γ-methacryloxypropyl methyl diethoxysilane, γ-mercaptopropyl methyl dimethoxysilane, γ-mercaptopropyl methyl diethoxysilane, γ-aminopropylmethyl dimethoxysilane, γ-aminopropylmethyl diethoxysilane, methyl vinyl dimethoxysilane, and methyl vinyl diethoxysilane.

The number of isocyanate groups and/or hydrolyzable groups bonded to the silicon atom is preferably at least two. If the number is less than two, no adequate mechanical strength tends to be secured. The most preferred compound is tetraisocyanate silane or tetraalkoxysilane, wherein four isocyanate groups or hydrolyzable groups are directly bonded to silicon, or a hydrolyzate prepared by using it as the starting material, such as ethyl silicate 40 (trimer to pentamer of tetraalkoxysilane, silica content: 40 wt %).

A reactive titanium compound includes, for example, various titanium alkoxides and their polymers, and various titanium chelate compounds.

Specifically, it includes tetraisopropoxy titanium, tetra n-butoxy titanium and its polymer, tetra(2-ethylhexyloxy) titanium, tetramethoxy titanium, diisopropoxy titanium bis (acetylacetonate), titanium tetrakis(acetylacetonate), di-n-butoxytitanium bis(octylene glycolate) $(C_4H_9O)_2Ti$ $(C_8H_{16}O_2)_2$, dihydroxytitanium dilactate $(HO)_2Ti(C_3H_5O_3)_2$, titanium bis(triethanolaminate) $Ti(C_6H_{13}O_3N)_2$, and diisopropoxytitanium bis(ethyl acetoacetate) $(C_3H_7O)_2Ti(C_6H_9O_3)_2$.

A reactive aluminum compound includes, for example, various aluminum alkoxides and their polymers, various aluminum chelate compounds and various cyclic aluminum oligomers. Specifically, it includes triisopropoxy aluminum, mono-sec-butoxy diisopropoxy aluminum, tri-sec-butoxy aluminum, triethyoxy aluminum, diisopropoxy aluminum ethylacetoacetate, aluminum tris(ethylacetoacetate), diisopropoxy aluminum methylacetoacetate, aluminum monoacetyl acetonate bis(ethylacetoacetate), aluminum tris (acetylacetonate), and cyclic aluminum oxide triisopropoxide $Al_3O_3(OC_3H_7)_3$.

A reactive zirconium compound includes, for example, various zirconium alkoxide compounds and their polymers, and various zirconium chelate compounds.

Specifically, it includes, for example, tetraisopropoxy zirconium, tetra n-butoxy zirconium, zirconium tetrakisacetylacetonate, tri n-butoxy zirconium acetylacetonate, and zirconyl acetate $ZrO(C_2H_3O_2)_2$.

A reactive tin compound includes, for example, various tin alkoxide compounds and their polymers, and various tin chelate compounds.

Specifically, it includes, for example, tetraisopropoxy tin, tetra n-butoxy tin, and dibutyl tin diacetylacetonate.

The proportion of compound (1) in the total amount of compounds (1) and (2) is not particularly limited and may be suitably determined depending upon the particular purpose. Namely, when it is desired to reduce the proportions of micropores in the film and fine concaves on the surface, the proportion of compound (1) may be reduced, and in an opposite case, it may be increased. If the amount of compound (1) relative to compound (2) is too much, the mechanical strength, stain-proofing properties and transparency of the coating film which is formed after heat decomposition, will decrease. Therefore, the amount of compound (1) relative to compound (2) is preferably at most 80 wt %. If it is too small, it tends to be difficult to obtain the effect of adding the fine polymer particles. Accordingly, it is preferably at least 5 wt %, more preferably from 5 to 60 wt %.

Compound (3) is a solvent for diluting compounds (1) and (2). It is preferred to dilute it for use, from the viewpoint of the operational and economical efficiency. As compound (3), an organic solvent such as an acetic acid ester, an aromatic hydrocarbon, a halogenated hydrocarbon, a ketone, an ether or an alcohol, may be used, and it is suitably selected depending upon the coating method. However, when compound (2) has isocyanate groups, an organic solvent having a reactive functional group (such as a hydroxyl group), such as an alcohol, is not suitable. Further, various cellosolve solvents such as ethyl cellosolve, various carbitol solvents such as butyl carbitol, or various glycol solvents such as ethylene glycol, polyethylene glycol and hexylene glycol, are preferred from the viewpoint of the film-forming properties, the physical properties of the film and the liquid life. These solvents have a relative slow drying speed and are solvents suitable for coating over a large area. Compound (3) may not be a single solvent and may be a solvent mixture of two or more such solvents.

To the treating agent, various additives may be incorporated depending upon the particular purpose. Such additives include, for example, a filler such as fine particles of a metal such as Sn, In, Al, Zn, Zr, Ti, Sb, Pb, Ta or Si or a metal oxide thereof, a surfactant, a pigment, a dye, and an ultraviolet absorber. Such additives are used in an amount of from 0.01 to 20 wt % based on the total weight of compound (2). If the amount of additives is less than 0.01, no substantial effect of the addition will be obtained. On the other hand, if it exceeds 20 wt %, the mechanical strength tends to be impaired.

At the time of surface treatment of the substrate, no special pretreatment is required. However, pretreatment may be carried out depending upon the particular purpose. For example, polishing treatment by means of cerium oxide or calcium carbonate, sand blast treatment, acid treatment with diluted hydrofluoric acid or hydrochloric acid, alkali treatment with e.g. an aqueous sodium hydroxide solution, discharge treatment such as ozone-oxidation treatment, ultraviolet ray treatment, or plasma irradiation, may be carried out.

The treating agent is coated on the surface by a usual method (such as brush coating, cast coating, rotary coating, dip coating, spray coating or various print coating), followed by heating and drying in atmospheric air or nitrogen. By this heat treatment, compound (1) is thermally decomposed to form micropores and fine craters. Accordingly, the heating temperature may be determined depending upon the heat resistance of compound (1) or the substrate. Usually, treatment is carried out within a temperature range of from 300° to 800° C.

It is also effective to introduce a step of drying by ultraviolet irradiation after coating the treating agent and prior to the heat drying step. The thermal decomposition of compound (1) by the heat treatment may not necessarily be complete, and compound (1) may partially remain to obtain adequate effects of the present invention.

The low reflecting properties of the coating film obtained by using the treating agent, can remarkably be improved by controlling the film thickness. The thickness of the coating film depends on the average particle size of compound (1) and can not generally be defined. However, it is usually preferably at least 0.6 time, more preferably at least 1.0 time, of the average particle size of compound (1). If the film thickness is less than this range, it tends to be difficult to form a plurality of micropores in the film. The upper limit for the film thickness is not critical and may suitably be determined depending upon the particular purpose. However, even if the film thickness is made so thick, the low reflecting properties will saturate. Accordingly, taking into the economical efficiency into account, a film thickness of at most 300 nm is preferred. In the present invention, it is important to control the film thickness by suitably selecting the concentration of the treating agent, the treating method, the treating conditions and the baking conditions, so that independent micropores will be formed.

In the present invention, the refractive index of the coating film will be determined by e.g. the above-described size, distribution and shape of micropores, the size, distribution and shape of the fine craters on the surface, and the material, thickness and film forming conditions of the coating film, and accordingly various conditions may be suitably selected depending upon the particular purpose. For the purpose of improving the low reflecting properties, it is preferred to adjust such conditions so that the refractive index of the coating film will be small i.e. so that the sizes and distributions of micropores and fine concaves will be large. The value of the refractive index is preferably set at a level of at most 1.40, preferably at most 1.35.

With the coating film of the present invention, it is possible to attain a low refractive index which has not been attained heretofore, and even when a single layer is applied directly to a substrate, adequately low reflecting properties can be attained over a wide range of wavelengths.

Further, it is possible to attain a higher level of low reflection by providing an interlayer between the coating film and the substrate in the present invention and to adjust the thickness and refractive index of the interlayer. The material, thickness and refractive index of the interlayer may be suitably selected depending upon the particular purpose or application (for example, depending upon the desired color for the reflection color on the film surface, or the wavelength which is desired to be prevented from reflection).

As such an interlayer, a film similar to the coating film of the present invention may be employed. In such a case, the densities, shapes or distributions of micropores and fine craters of the interlayer are differentiated from those of the coating film of the outermost layer as the surface layer, otherwise there will be no physical significance.

Figure 1:
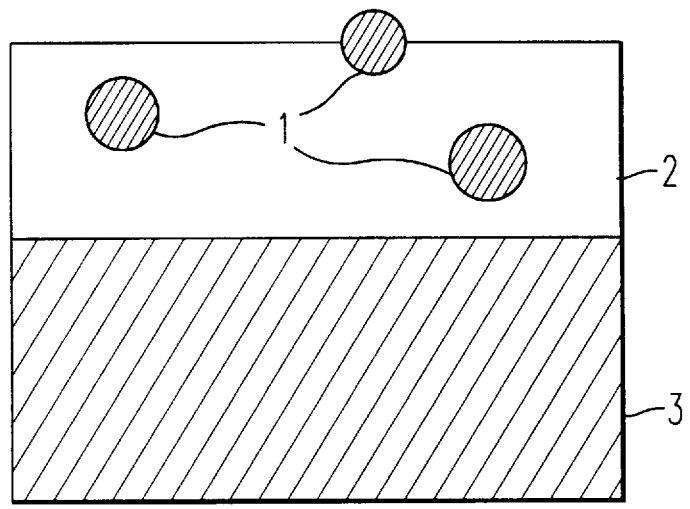
FIG. 1 is a diagrammatical cross-sectional view illustrating an intermediate stage during the preparation of the laminate of the present invention.
Figure 2:
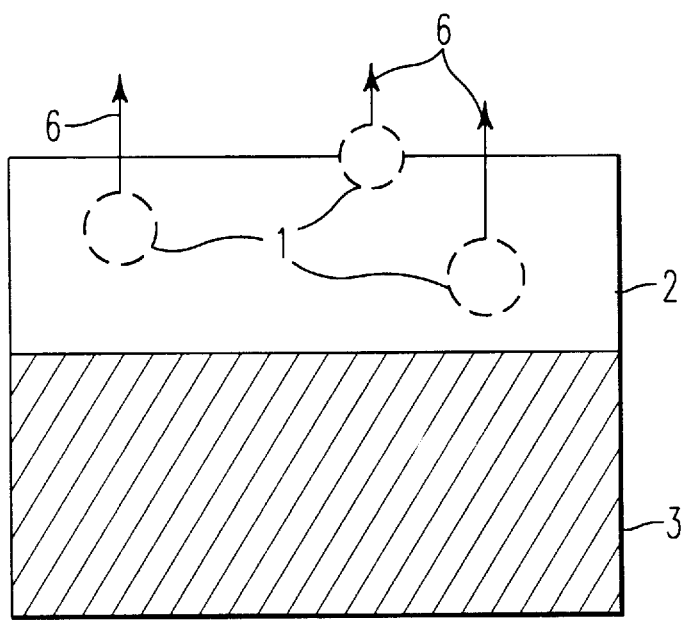
FIG. 2 is a diagrammatical cross-sectional view illustrating another intermediate stage during the preparation of the laminate of the present invention.
Figure 3:
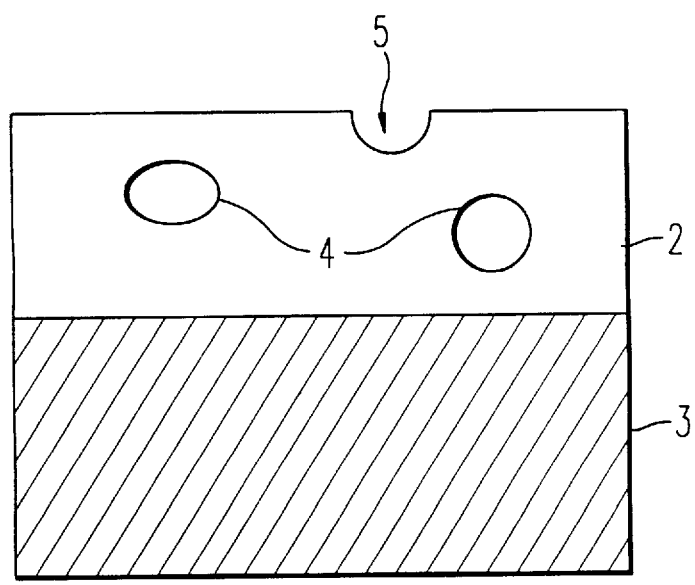
FIG. 3 is a diagrammatical cross-sectional view of the laminate of the present invention.

The mechanism for formation of micropores and fine craters when the above-described treating agent is employed, is not elucidated, but may be explained as follows. FIGS. 1 to 3 are drawings illustrating the process of the present invention.

In these Figures, reference numeral 1 indicates fine polymer particles, numeral 2 the outermost layer as a surface layer, numeral 3 a substrate, numeral 4 micropores in the film, numeral 5 fine craters, and the arrow of numeral 6 a state in which compound (1) is gasified and evaporating.

It is believed that immediately after coating the treating agent, a liquid film is formed as shown in FIG. 1. Then, in the initial stage of the heat treating step, curing starts from the surface of the liquid film, and a part of compound (1) will be sealed in the film. At a stage where heating and curing have further progressed, compound (1) undergoes thermal decomposition, and the gasified compound (1) will evaporate by passing through micropore portions of compound (2) which is being cured and shrinking, as shown in FIG. 2. Further, at this stage, compound (1) present on the film surface will be thermally decomposed and gasified and will evaporate, whereby fine craters are believed to be formed on the surface.

Finally, at the end of the heat treating step, curing of compound (2) will be completed as shown in FIG. 3, whereby the desired structure is believed to be obtained.

The substrate to be used in the present invention is not particularly limited. For example, a metal, glass, ceramics, other inorganic materials or organic materials, or a combination thereof (a composite material, a laminated material, etc.) may be used.

The surface of the substrate may be the substrate surface itself, or a surface of a material different from the substrate surface such as a coated surface of e.g. a coated metal plate, or a surface of the surface-treated layer of surface-treated glass.

For example, the substrate surface may already have a vapor-deposited film, a sputtered film or various films formed by e.g. a wet method. The various films include, for example, an antistatic film, a transparent conductive film, an electromagnetic wave-shielding film, a colored film, an ultraviolet ray absorbing film, a heat ray absorbing film, and a heat ray reflecting film. These films may be used alone or in combination. The materials for the various films are not limited, and films containing oxides of metals such as Si, Zr, Ti, Zn, Al, Sn, Sb, Pb and Ta, may, for example, be mentioned.

The shape of the substrate is not limited to a flat plate and may be an optional shape depending upon the particular purpose, such as the one having a curvature over the entire surface or at a part thereof.

In the present invention, a particularly suitable substrate is a substrate made of a transparent material such as glass, and a laminate of the present invention is suitable for an article utilizing the transparency. For example, it is suitable for use as an article for transportation equipments, an article for buildings or building decorations, an article for display panels or display, or an article for a solar cell.

The article for transportation equipments includes, for example, exterior parts such as window glasses, mirrors or display panels, interior parts such as instrument panels, of transportation equipments such as electric cars, buses, trucks, automobiles, ships or aircrafts, and parts or constituting elements to be used in other transportation equipments.

More specifically, it may, for example, be a window glass of an automobile, made of the laminate of the present invention, or a back mirror part for an automobile, having a glass mirror made of the laminate of the present invention incorporated therein.

By using the laminate of the present invention as described above, glare at the surface will be eliminated by low reflection, the visibility will be improved, and the safety during driving will be improved. Especially, reduction of reflection at meters of instrument panels, makes it possible to change the shape of the dash board of a vehicle, whereby an effect from the viewpoint of a design can be expected. Further, such an article or part has high durability and stain-proofing properties at the same time, whereby the function of low reflecting properties can be maintained over a long period of time.

The articles for buildings or building decorations may, for example, be articles to be attached to buildings or articles already attached to buildings, or articles for buildings which are not attached to buildings but which are used for the buildings, articles for building decorations such as furnitures or equipments, and base materials (such as glass plates) constituting such articles.

Specifically, they include window glass plates, window glasses, glass plates for roofs, various roofs including glass roofs, glass plates for doors or doors having such glass plates installed, glass plates for partitions, glass plate for greenhouses, or greenhouses having such glass plates, transparent plastic plates to be used instead of glass, the above-mentioned various articles for buildings (window materials and roof materials) having such plastic plates incorporated, wall materials made of ceramics, cement, metals or other materials, mirrors, furnitures having such mirrors, and glass for display shelves or showcases, and cover glass for paintings.

More specifically, they include a window glass plate made of the laminate of the present invention, and a furniture having a glass mirror made of the laminate of the present invention incorporated.

By using the laminate of the present invention as described above, improvement of the visibility is expected by the low reflecting properties, whereby comfortableness in using such a product will be improved. Further, such an article or part has high durability and stain-proofing properties simultaneously, whereby the function of low reflecting properties can be maintained over a long period of time. As the display panel article, a transparent part (glass substrate or resin substrate) useful for a liquid crystal display panel, a plasma display panel, an electrochromic display panel, an electroluminescence display panel or a touch panel, may be mentioned.

More specifically, as an article which is attached to the entire surface of the panel, a protective cover glass or a cover resin substrate made of the laminate of the present invention may be mentioned. Further, it may be the one having a transparent electrode formed on the other side of the substrate on which the coating film of the laminate of the present invention is formed, or the one having the laminate of the present invention tempered by heat treatment.

Especially, the transparent electrode has a high refractive index, whereby the reflectance increases, which causes a decrease in the visibility. By providing the low reflecting function on the rear side of the transparent electrode, of such a substrate, the light transmittance will be improved, and the visibility will be improved. Further, as the light transmittance increases, brightness increases, whereby reduction of the power consumption by a plasma display panel or by back light of a liquid crystal display panel, can be expected. Further, such an article or part has high durability and stain-proofing properties simultaneously, whereby the function of the low reflecting properties can be maintained over a long period of time.

The display article may, for example, be an article or part such as a bulb, a panel or a telepanel or a VDT filter which is attached by a resin to a panel surface, as a constituting element of e.g. a cathode ray tube for television or a display terminal for a computer.

Such a part may be the one treated with only one layer of the coating film of the present invention, or the one having a multilayer coating having an antistatic function or an electromagnetic shielding function. Especially a display having the latter part as a constituting element, will have an improved visibility, which in turn improves the environment for operators at computer terminals. Further, such an article or part has high durability and stain-proofing properties simultaneously, whereby the function of low reflecting properties can be maintained over a long period of time.

The article for a solar cell may, for example, be a protective covering part of a solar cell or a transparent conductive part for a solar cell, made of glass or a resin. For example, it may be a part for protecting a solar cell module for electric power, for a building, for a consumer product, or for a vehicle, or a part having a low reflecting function on the rear side of the transparent electrode of the solar cell. The solar cell having such a part as a constituting element, is capable of effectively taking in the sunlight, whereby a high conversion efficiency can be obtained. For the conversion efficiency of the solar cell, the wavelength at which the conversion to electric power can be most efficiently be made, slightly differs depending upon the material used. Accordingly, a higher conversion efficiency may be obtained by using, as a constituting element, a part having the lowest reflectance at a wavelength where the material is capable of most efficiently accomplishing the conversion to electric power.

Such a part has high durability and stain-proofing properties simultaneously, whereby the low reflecting function can be maintained over a long period of time to maintain the high conversion efficiency.

Now, the present invention will be described in further detail with reference to Examples and Comparative Examples. However, it should be understood that the present invention is by no means restricted to such specific Examples.

Testing methods for evaluating samples obtained in the following Examples and Comparative Examples, were as follows.

Method for measuring the low reflecting properties (visible light reflectance)

In accordance with the measuring method disclosed in JIS R3106 paragraph 3.3.3 for measurement of spectral reflectance of sheet glass, the spectral reflectance was measured by a spectrometer (ART-25GT Model, manufactured by Nippon Bunko Kogyo K.K.).

Haze

In accordance with the haze-measuring method disclosed in JIS K7105, the haze was measured by a haze meter (TC-HIII Model, manufactured by Tokyo Denshoku K.K.).

Taber test

In accordance with the method for an abrasion resistance test disclosed in JIS R3212, an abrasion resistance test was carried out by a Taber abrader (manufactured by Taber Co.), and then the haze was measured.

Bencot abrasion test

Using a reciprocating abrader manufactured by KNT Co. as a testing machine, an abrasion resistance test was carried out under a load of 1.5 kg and 100 reciprocations with a Bencot (manufactured by Asahi Kasei Kogyo K.K.) as an abrading material. Then, the appearance after the test was evaluated under the following standards.

A: No scratch mark was observed.
B: Slight scratch marks were observed.
C: Substantial scratch marks were observed.
D: The film peeled.

Boiling test

The adhesive property after dipping in boiling water for 1 hour, was evaluated by a cross cut test.

Method for evaluating the stain-proofing properties

A finger print was put on the surface of a sample, and then the finger print was wiped off by reciprocating a cotton cloth 10 times. After the test, the appearance of the film was visually inspected and evaluated under the following standards:

A: The finger print removed completely.
B: The finger print remained slightly
C: The finger print remained substantially.

Methods for measuring the film thickness, the average size and volume ratio of micropores, and the average size of fine craters In the method for measuring the film thickness, a sample cooled to a liquid nitrogen temperature was broken, and the broken section was inspected by a scanning electron microscope (SEM), whereby the film thickness was measured by comparing it with a reference sample. For determination of the average size of micropores, the sizes of micropores present in an optional range of the broken section (750 nm×film thickness) are measured, and the average value was taken as the average size of micropores. For determination of the volume ratio of micropores, the area ratio of micropores within an optional range at the broken section (750 nm×film thickness) was calculated from the number and average size of micropores present in that range, and the same operation was repeated 10 times with respect to an optional broken section in the same sample, and the average value of the area ratios thereby obtained was taken as the volume ratio. For the determination of the average size of fine craters, the number and sizes of fine craters present in an optional 750×750 nm area in the image of the surface obtained by a SEM inspection, were measured, and the average value was taken as the average size of the fine craters.

Methods for measuring $R_a$ of the flat portion and the area ratio of the flat portion A 700×700 nm area on the sample surface was inspected by an atomic force microscope (AFM), and the one dimensional roughness $R_a$ between optional two points of the flat portion, was calculated as defined in JIS B0601. The area ratio of the flat portion was determined by measuring the sizes and the number of fine craters present in an optional 750×750 nm area on the surface obtained by the SEM inspection, calculating the area of the fine craters in the 750×750 area, calculating the proportion of the fine craters, and the rest was taken as the flat portion.

EXAMPLE 1

Into a container equipped with a stirrer and a thermometer, 25.0 g of fine particles of PMMA (average particle size: 0.08 μm) and 75.0 g of methyl ethyl ketone were introduced, stirred at 15° C. for 30 minutes and then subjected to ultrasonic wave dispersing treatment for 3 hours to obtain a PMMA dispersion.

Separately, into a container equipped with a stirrer and a thermometer, 107.2 g of hexylene glycol was introduced. Then, 12.8 g of the above PMMA dispersion, 20.0 g of Ethyl Silicate 40 (manufactured by Tama Kagaku K.K.) and 20.0 g of a 4 wt % hydrochloric acid aqueous solution were sequentially added thereto, and the mixture was stirred at 15° C. for 30 minutes and then subjected to ultrasonic wave dispersing treatment for 3 hours to obtain treating agent E1.

Treating agent E1 was coated by flexo printing on a glass plate which was preliminarily cleaned by polishing with cerium oxide, and heat treatment was carried out at 500° C. for 10 minutes in a muffle furnace. After the heat treatment, the plate was taken out from the muffle furnace and cooled to room temperature to obtain a test specimen. The test specimen was evaluated, and the results are shown in Tables 1 to 3 together with the results of evaluation of the test specimens of Examples 2 to 15.

In the Tables, the (1)/(2) weight ratio is the ratio of the weight of compound (1) as calculated as its solid content to the weight of compound (2) as calculated as its solid content.

EXAMPLE 2

A polystyrene dispersion was prepared in the same manner as in Example 1 except that 25.0 g of fine particles of PMMA (average particle size: 0.08 μm) and 75.0 g of methyl ethyl ketone in Example 1 were changed to 25.0 g of fine particles of polystyrene (average particle size: 0.06 μm) and 75.0 g of water.

Further, treating agent E2 was prepared in the same manner as in Example 1 except that 12.8 g of the PMMA dispersion and 20.0 g of the 4 wt % hydrochloric acid aqueous solution in Example 1 were changed to 12.8 g of the above polystyrene dispersion and 10.4 g of a 4 wt % hydrochloric acid aqueous solution. Then, using treating agent E2, a test specimen was prepared in the same manner as in Example 1.

EXAMPLE 3

A polystyrene dispersion was prepared in the same manner as in Example 1 except that 25.0 g of fine particles of PMMA (average particle size: 0.08 μm) and 75.0 g of methyl ethyl ketone in Example 1 were changed to 25.0 g of fine particles of polystyrene (average particle size: 0.015 μm) and 75.0 g of water.

Further, treating agent E3 was prepared in the same manner as in Example 1 except that 12.8 g of the PMMA dispersion and 20.0 g of the 4 wt % hydrochloric acid aqueous solution in Example 1 were changed to 12.8 g of the above polystyrene dispersion and 10.4 g of a 4 wt % hydrochloric acid aqueous solution. Then, using treating agent E3, a test specimen was prepared in the same manner as in Example 1.

EXAMPLE 4

A PMMA dispersion was prepared in the same manner as in Example 1 except that 25.0 g of fine particles of PMMA (average particle size: 0.08 μm) in Example 1 was changed to 25.0 g of fine particles of PMMA (average particle size: 0.15 μm). Further, treating agent E4 was prepared in the same manner as in Example 1. Then, using treating agent E4, a test specimen was prepared in the same manner as in Example 1.

EXAMPLE 5

Treating agent E5 having the same composition as treating agent E1 used in Example 1 was prepared. Treating agent E5 was coated by flexo printing on the surface of an aluminum oxide coating film of a glass substrate, which was preliminarily prepared to have an aluminum oxide coating film (refractive index: 1.60) having a thickness of 70 nm on the surface, and heat treatment was carried out at 500° C. for 5 minutes in a muffle furnace. After the heat treatment, the substrate was taken out from the muffle furnace and cooled to room temperature to obtain a test specimen.

EXAMPLE 6

A PMMA dispersion was prepared in the same manner as in Example 1. Separately, in a container equipped with a stirrer and a thermometer, 131.7 g of hexylene glycol was introduced. Then, 3.3 g of the above PMMA dispersion and 15.0 g of tetrabutoxytitanium were sequentially added, and the mixture was stirred at 15° C. for 30 minutes and then subjected to supersonic dispersing treatment for 3 hours to obtain treating agent E6.

Treating agent E6 was coated by flexo printing on a glass plate which was preliminarily cleaned by polishing with cerium oxide, and heat treatment was carried out at 500° C. for 10 minutes in a muffle furnace. After the heat treatment, the plate was taken out from the muffle furnace and cooled to room temperature to obtain a test specimen.

EXAMPLE 7

A PMMA dispersion was prepared in the same manner as in Example 1 except that 25.0 g of fine particles of PMMA (average particle size: 0.08 μm) in Example 1 was changed to 25.0 g of fine particles of PMMA (average particle size: 0.30 μm). Further, treating agent E7 was prepared in the same manner as in Example 1.

Treating agent E7 was coated by flexo printing on a glass plate which was preliminarily cleaned by polishing with cerium oxide, and heat treatment was carried out at 500° C. for 10 minutes in a muffle furnace. After heat treatment, the plate was taken out from the muffle furnace and cooled to room temperature to obtain a test specimen.

EXAMPLE 8

A PMMA dispersion was prepared in the same manner as in Example 1. Separately, in a container equipped with a stirrer and a thermometer, 116.8 g of hexylene glycol was introduced. Then, 3.2 g of the above PMMA dispersion, 20.0 g of Ethyl Silicate 40 (manufactured by Tama Kagaku K.K.) and 20.0 g of a 4 wt % hydrochloric acid aqueous solution were sequentially added, and the mixture was stirred at 15° C. for 30 minutes and then subjected to ultrasonic wave dispersing treatment for 3 hours to obtain treating agent E8. Then, using treating agent E8, a test specimen was prepared in the same manner as in Example 1.

EXAMPLE 9

A PMMA dispersion was prepared in the same manner as in Example 1. Separately, in a container equipped with a stirrer and a thermometer, 100.8 g of hexylene glycol was introduced. Then, 19.2 g of the above PMMA dispersion, 20.0 g of Ethyl Silicate 40 (manufactured by Tama Kagaku K.K.) and 20.0 g of a 4 wt % hydrochloric acid aqueous solution were sequentially added, and the mixture was stirred at 15° C. for 30 minutes and then subjected to ultrasonic wave dispersing treatment for 3 hours to obtain treating agent E9. Then, using treating agent E9, a test specimen was prepared in the same manner as in Example 1.

EXAMPLE 10

A PMMA dispersion was prepared in the same manner as in Example 1. Separately, in a container equipped with a stirrer and a thermometer, 68.1 g of hexylene glycol was introduced. Then, 32.0 g of the above PMMA dispersion, 50.0 g of Ethyl Silicate 40 (manufactured by Tama Kagaku K.K.) and 50.0 g of a 4 wt % hydrochloric acid aqueous solution were sequentially added, and the mixture was stirred at 15° C. for 30 minutes and then subjected to ultrasonic wave dispersing treatment for 3 hours to obtain treating agent E10 . Then, using treating agent E10, a test specimen was prepared in the same manner as in Example 1.

EXAMPLE 11

A PMMA dispersion was prepared in the same manner as in Example 1. Separately, in a container equipped with a stirrer and a thermometer, 88.0 g of hexylene glycol was introduced. Then, 32.0 g of the above PMMA dispersion, 20.0 g of Ethyl Silicate 40 (manufactured by Tama Kagaku K.K.) and 20.0 g of a 4 wt % hydrochloric acid aqueous solution were sequentially added, and the mixture was stirred at 15° C. for 30 minutes and then subjected to ultrasonic wave dispersing treatment for 3 hours to obtain treating agent E11. Then, using treating agent E11, a test specimen was prepared in the same manner as in Example 1.

EXAMPLE 12

A PMMA dispersion was prepared in the same manner as in Example 1. Separately, in a container equipped with a stirrer and a thermometer, 267.2 g of hexylene glycol was introduced. Then, 12.8 g of the above PMMA dispersion, 20.0 g of Ethyl Silicate 40 (manufactured by Tama Kagaku K.K.) and 20.0 g of a 4 wt % hydrochloric acid aqueous solution were sequentially added, and the mixture was stirred at 15° C. for 30 minutes and then subjected to ultrasonic wave dispersing treatment for 3 hours to obtain treating agent E12. Then, using treating agent E11, a test specimen was prepared in the same manner as in Example 1.

EXAMPLE 13 (COMPARATIVE EXAMPLE )

Treating agent R1 was prepared in the same manner as in Example 1 except that no PMMA dispersion was used, and the stirring temperature was changed to 25° C. in Example 1. Then, using treating agent R1, a test specimen was prepared in the same manner as in Example 1.

EXAMPLE 14 (COMPARATIVE EXAMPLE)

Using a glass plate which was cleaned by polishing with cerium oxide, as a test specimen, the low reflecting properties were examined.

EXAMPLE 15 (COMPARATIVE EXAMPLE)

Into a container equipped with a stirrer and a thermometer, 131.7 g of hexylene glycol and 15.0 g of tetrabutoxytitanium were sequentially added, and the mixture was stirred at 25° C. for 30 minutes and then subjected to ultrasonic dispersing treatment for 3 hours to obtain treating agent R3. Then, using treating agent R3, a test specimen was prepared in the same manner as in Example 1.

EXAMPLE 16

The test specimen prepared in Example 1 was dipped in a reagent as identified in Table 4 for 24 hours, then taken out and immediately cleaned, whereupon the change in the appearance of this test specimen was evaluated. The results are shown in Table 4. From Table 4, it is apparent that the glass of the present invention is superior in the chemical resistance.

EXAMPLE 17

Using the test specimen prepared in Example 1, a weather resistance test of 200 cycles was carried out, each cycle comprising ultraviolet irradiation of 8 hours (70° C.) and humidity exposure of 4 hours (50° C). The film appearance after the test and the spectral reflectance and the haze were evaluated.

With respect to the film appearance, the initial state was maintained without cracking, peeling or color change. The visible light reflectance and the haze were 0.7 and 0.2, respectively, which were not substantially different from the initial state. From these results, it is evident that the glass of the present invention is excellent in weather resistance.

EXAMPLE 18

Using two glass substrates treated in the same manner as in Example 1, a laminated glass windshield for an automobile was prepared so that the coating films were located outside and inside of the vehicle. This laminated glass windshield for an automobile was mounted on an automobile. This automobile was subjected to driving tests in various environments for 6 months, whereby the effect for reducing reflection of light on the windshield surface was visually observed.

As a result, no reflection of an article placed on a dash board to the windshield was noticed during driving, and the driving was safe and comfortable. Further, even under a situation where light came from the rear side of the vehicle to the windshield, no reflection of light was bothering. Further, even when the outside landscape was observed at an inclined angle from the inside of the vehicle, bothering reflection as was observed usually, was not observed, and a good visual field was secured.

Further, no reflection of an indicator, a display image or a lamp of a meter (such as a clock, a navigation system or a television) to a glass, was observed during driving at night, and the driving was safe and comfortable. Further, the glass was cleaned frequently with a wiping cloth, whereby no scratch mark was observed. Further, the automobile was washed by an automatic car washer at a gasoline station at a frequency of twice per month, whereby no formation of scratch marks was observed, and adequate abrasion resistance was confirmed.

Further, during the day time, the automobile was parked at a place where the sunlight irradiates. Nevertheless, there was no change in the appearance of the film or the effect of reducing the light, and thus adequate weather resistance was confirmed.

Furthermore, the degree of deposition of stain was equivalent to conventional glass, and the deposited stain was readily removed by gentle wiping with a tissue paper or the like.

From these results, a vehicle having the above windshield is considered to be a vehicle which is remarkably superior to conventional vehicles from the viewpoint of the safety. Further, the effect of reducing reflection is believed to make it possible to employ a bright color as an interior color which used to be difficult to employ from the viewpoint of the safety and to make it possible to change the shape of the vehicle, whereby not only the safety and comfortableness of the vehicle, but also an additional effect from the viewpoint of the design can be expected.

EXAMPLE 19

On both sides of a side window glass and a rear window glass of an automobile, the coating film was formed in the same manner as in Example 1, and such side and rear window glasses were mounted on an automobile. Using this automobile, the driving test was carried out in the same manner as in Example 18, whereby the effect for reducing light was confirmed as in Example 18. Further, the weather resistance and durability such as abrasion resistance were also excellent as in Example 18.

EXAMPLE 20

Using a substrate treated in the same manner as in Example 1, a cover glass for an instrument display panel was prepared and was mounted so that the treated portion faced inside of the automobile (i.e. so that the non-treated portion was on the side of meters). Using this automobile, the driving test was carried out in the same as in Example 18, whereby the same effect for reducing light as in Example 18 was confirmed. Further, the weather resistance and the abrasion resistance were excellent as in Example 18.

EXAMPLE 21

In the same manner as in Example 1, coating on both sides of a window glass for buildings was carried out to form coating films. The obtained window glass was mounted on a south side of a house. The effect for reducing reflection of light on this window glass surface was visually observed.

As a result, reflection of an article placed at the window side to the window glass was eliminated, and a clear visual field was secured. Further, even when the outside landscape was observed through the window glass at an inclined angle, no reflection was bothering, and a good visual field was secured.

Further, deposition of a stain on the surface was substantially equal to conventional glass, but due to the effect of reduced reflection, deposition of stain was less distinctive, and in that sense, improvement in the comfortableness was actually felt. The window glass was cleaned frequently with a commercially available cleanser and cleaner, whereby no formation of scratch marks was observed, whereby adequate mechanical strength was confirmed. Further, the sunlight was irradiated for a long period of time during the day time, but no change was observed in the appearance of the film or the effect for reducing light, whereby adequate weather resistance was confirmed.

EXAMPLE 22

On the rear side of an tin oxide transparent conductive glass having a thickness of 1.1 mm having films formed by CVD (chemical vapor deposition) (glass/$SnO_2$ (80 nm)/$SiO_2$ (70 nm)/$SnO_2$ (20 nm)), coating was applied in the same manner as in Example 1 to form a coating film. As a result, the visible light transmittance of the substrate was 97.5%. A photoresist was coated on the transparent conductive film of the obtained substrate glass, followed by exposure, and then zinc was applied, followed by patterning by means of a dilute hydrochloric acid solution. The obtained patterning substrate was attached in the sequence of liquid crystal panel/patterning substrate/plastic film provided with a transparent conductive film, to obtain a liquid crystal touch panel. Here, the panel was constructed so that the conductive film of the patterning substrate was in contact with the conductive film of the plastic film.

As a result, reflection of a surrounding article to the panel was eliminated, and a clear visual field was secured, and the visibility was excellent. Further, even when the panel was observed from an inclined angle, no reflectance was bothering, and an excellent visual field was secured.

Further, scratching at the time of mounting it to the panel was substantially the same as in the case of conventional glass, whereby adequate mechanical strength was confirmed. Further, due to the effect of reduced reflection, the scratch marks were less distinctive.

EXAMPLE 23

A substrate having a coating film formed on tempered glass in the same manner as in Example 1, was placed in a vacuum chamber, and 10 nm of $TiN_x$ and 100 nm of $SiO_2$ were sequentially formed by sputtering on the opposite side of the coating film.

As the target, metal Ti and single crystal P-doped Si were used. As discharge gases, a gas mixture of Ar and $N_2$ ($N_2$ volume %=20%) and a gas mixture of Ar and $O_2$ ($O_2$ volume %=50%) were used respectively. The film-forming pressure was $2 \times 10^{-3}$ Torr, and a direct current power of 2.0 W/cm$^2$ was applied to the Ti target, and to the Si target, an intermittent DC power source was used for application.

The visual reflectance from the film side formed by sputtering of the obtained substrate was 0.2%. The obtained substrate glass was mounted on the display surface for CRT, so that the coating film would be on the viewer's side and the sputter coating side would be on the opposite side from the viewer.

As a result, reflection of a surrounding article on the panel was eliminated, and the contrast of the display image increased, whereby the visibility was excellent. Further, even when the panel was observed from an inclined angle, no reflection was bothering, and an excellent visual field was secured. Further, a finger print deposited was readily removed by gently wiping the surface.

Further, no scratch marks were observed, whereby adequate mechanical strength was confirmed. Further, due to the effect of reduced reflection, scratch marks were less distinctive.

EXAMPLE 24

Treating agent E1 was coated by flexo printing on a glass plate having a thickness of 4 mm which was preliminarily cleaned by polishing with cerium oxide, and heat treatment was carried out at 300° C. for 30 minutes in a muffle furnace. Then, also on the opposite side of the glass plate, treating agent E1 was coated, and heat treatment was carried out at 300° C. for 30 minutes. Further, the plate was heated again to 650° C. and then rapidly cooled by air for tempering treatment.

As a result, the visible light transmittance of the substrate was 97%. The substrate was mounted on the upper surface of a polycrystal Si solar cell module, whereby a conversion efficiency of 12.2% was obtained. Further, due to the low reflection, glare of sunlight was prevented, whereby an excellent appearance was obtained. Further, deposition of a dust was prevented, and a high conversion efficiency was maintained over a long period of time.

TABLE 1

| Example No. | Visible light transmittance (%) | Film thickness (nm) | Bencot abrasion test | Change in the haze between before and after the Tabor test (%) |
|---|---|---|---|---|
| 1 | 0.6 | 86 | A | 1.8 |
| 2 | 0.4 | 100 | A | 1.8 |
| 3 | 1.5 | 90 | A | 1.9 |
| 4 | 0.3 | 100 | A | 1.8 |
| 5 | 0.2 | 88 | A | 1.9 |
| 6 | 15.0 | 70 | B | 2.7 |
| 7 | 2.2 | 160 | B | 2.2 |
| 8 | 1.8 | 96 | A | 1.7 |
| 9 | 0.2 | 102 | B | 2.5 |
| 10 | 1.3 | 350 | B | 2.5 |
| 11 | 0.1 | 110 | C | 3.8 |
| 12 | 2.7 | 33 | A | 1.8 |
| 13 | 3.1 | 80 | A | 1.7 |
| 14 | 4.6 | — | — | — |
| 15 | 24.2 | 69 | B | 3.0 |

TABLE 2

| Example No. | Average size of micropores (nm) | Volume ratio of micropores (%) | Average size of fine craters (nm) | Film thickness/ average particle size of compound (1) | (1)/(2) weight ratio (%) |
|---|---|---|---|---|---|
| 1 | 50 | 22 | 55 | 1.06 | 40 |
| 2 | 42 | 20 | 45 | 1.67 | 40 |
| 3 | 9 | 10 | 10 | 6.00 | 40 |
| 4 | 90 | 25 | 85 | 0.67 | 40 |
| 5 | 47 | 22 | 50 | 1.25 | 40 |
| 6 | 52 | 21 | 55 | 0.88 | 40 |
| 7 | 120 | 22 | 120 | 0.64 | 40 |
| 8 | 49 | 7 | 55 | 1.20 | 10 |
| 9 | 51 | 30 | 55 | 1.28 | 60 |
| 10 | 51 | 22 | 53 | 4.38 | 40 |
| 11 | 55 | 37 | 60 | 1.38 | 100 |
| 12 | 6 | 3 | 54 | 0.41 | 40 |
| 13 | *1 | *1 | *1 | — | — |
| 14 | *1 | *1 | *1 | — | — |
| 15 | *1 | *1 | *1 | — | — |

*1: No presence was observed by the SEM observation.

TABLE 3

| Example No. | Stain-proofing properties | Boiling test | Haze (%) | Flat portion $R_a$ (nm) | Area ratio of flat portion (%) |
|---|---|---|---|---|---|
| 1 | A | 100/100 | 0.2 | 0.351 | 87 |
| 2 | A | 100/100 | 0.1 | 0.421 | 89 |
| 3 | A | 100/100 | 0.2 | 0.341 | 93 |
| 4 | A | 100/100 | 0.1 | 0.658 | 75 |
| 5 | A | 100/100 | 0.1 | 0.362 | 85 |
| 6 | A | 100/100 | 0.2 | 0.871 | 81 |
| 7 | B | 100/100 | 1.1 | 0.950 | 72 |
| 8 | A | 100/100 | 0.1 | 0.368 | 89 |
| 9 | B | 100/100 | 0.1 | 0.878 | 69 |
| 10 | A | 100/100 | 0.2 | 0.573 | 93 |
| 11 | B | 100/100 | 0.3 | 0.968 | 32 |
| 12 | A | 100/100 | 0.1 | 0.983 | 23 |
| 13 | A | 100/100 | 0.1 | 0.367 | 100 |
| 14 | A | 100/100 | 0.1 | 0.214 | 100 |
| 15 | A | 100/100 | 0.2 | 0.437 | 100 |

TABLE 4

| Reagent | Change in appearance |
|---|---|
| Methanol | No change |
| Acetone | No change |
| Toluene | No change |
| Water | No change |
| 1% $H_2SO_4$ aqueous solution | No change |
| 1% NaOH aqueous solution | No change |
| Commercial cleaning agent | No change |
| Gasoline | No change |

The laminate of the present invention has effects such that 1) it is excellent in transparency and low reflecting properties and prevents glare or reflection at the film surface, whereby visibility will be improved, and 2) it is excellent in abrasion resistance, chemical resistance, stain-proofing properties and weather resistance, whereby it is excellent in maintaining the low reflecting properties and capable of maintaining such properties semipermanently. Thus, it is most suitable in the field for transportation equipments, the field for buildings and building decorations, the field for display panels, the field of displays and the field for solar cells.

The foregoing effects can not be expected with conventional materials, and it is expected that the application of the laminate of the present invention can be expanded to fields in which conventional materials were not applicable.

What is claimed is:

1. A laminate comprising a substrate and at least one layer formed on the substrate, in which the outermost layer as a surface layer has a plurality of micropores therein and, at its surface, a flat portion and fine craters, said flat portion having a surface roughness $R_a$ of at most 3 nm and an area ratio of at least 20%, and wherein the volume ratio of the micropores in the outermost layer is from 3 to 35%.

2. The laminate according to claim 1, wherein the average size of the micropores is from 10 to 150 nm.

3. The laminate according to claim 1, wherein the average size of the craters is from 10 to 150 nm.

4. The laminate according to claim 1, wherein the outermost layer comprises an oxide of at least one metal selected from the group consisting of Si, Al, Ti, Zr and Sn, as the main component.

* * * * *